United States Patent [19]

van der Lely et al.

[11] 4,375,837
[45] Mar. 8, 1983

[54] SOIL CULTIVATING MACHINE WITH AXIALLY DISPLACEABLE ADJUSTING ROD

[75] Inventors: Ary van der Lely, Maasland; Cornelis J. G. Bom, Rozenburg, both of Netherlands

[73] Assignee: C. Van der Lely N.V., Weverskade, Netherlands

[21] Appl. No.: 109,090

[22] Filed: Jan. 2, 1980

[30] Foreign Application Priority Data

Jan. 12, 1979 [NL] Netherlands ............ 7900240

[51] Int. Cl.³ ............... A01B 33/06; A01B 49/02
[52] U.S. Cl. ............... 172/68; 172/481; 172/502; 172/504; 403/97; 403/166
[58] Field of Search ............ 172/59, 68, 70, 395, 172/413, 502, 427, 739, 744, 481, 504; 403/97, 87, 116, 146; 74/470; 280/43.23

[56] References Cited

U.S. PATENT DOCUMENTS

| 2,165,460 | 7/1939 | Desing | 403/97 |
| 2,856,218 | 10/1958 | Helsel | 403/166 |
| 3,486,761 | 12/1969 | Fay | 280/43.23 |
| 3,686,964 | 8/1972 | Thibaut et al. | 74/470 X |
| 3,899,030 | 8/1975 | van der Lely et al. | 172/68 |
| 3,983,943 | 10/1976 | van der Lely | 172/70 |
| 4,018,104 | 4/1977 | Bland et al. | 403/116 X |
| 4,240,508 | 12/1980 | Ishiguro et al. | 172/744 X |

FOREIGN PATENT DOCUMENTS 815288 6/1969 Canada .................. 172/413

Primary Examiner—Richard T. Stouffer
Attorney, Agent, or Firm—Penrose Lucas Albright

[57] ABSTRACT

A soil cultivating machine has a frame portion extending transversely of the intended direction of operative travel and a row of cultivating members on that portion are rotatable about upwardly extending shafts. Behind the cultivating members there is a ground-engaging support roller pivotally connected with the frame portion by means of supporting arms. A mechanism, including a screw spindle or an hydraulic ram is provided for adjusting the roller in a direction of height to vary the working level and a locking device for fixing the roller against pivotal movement relative to the frame portion is also included. The locking device includes two parts that can be clamped against one another with relatively co-operating toothings interengaged. A resilient device on a rod of the mechanism is provided to allow relative movement between the co-operating toothings at the time of clamping the parts together. As relative movement of the co-operating toothings can occur at the time of clamping them together, they can move into full engagement should this be necessary without additional load being placed on the machine.

7 Claims, 6 Drawing Figures

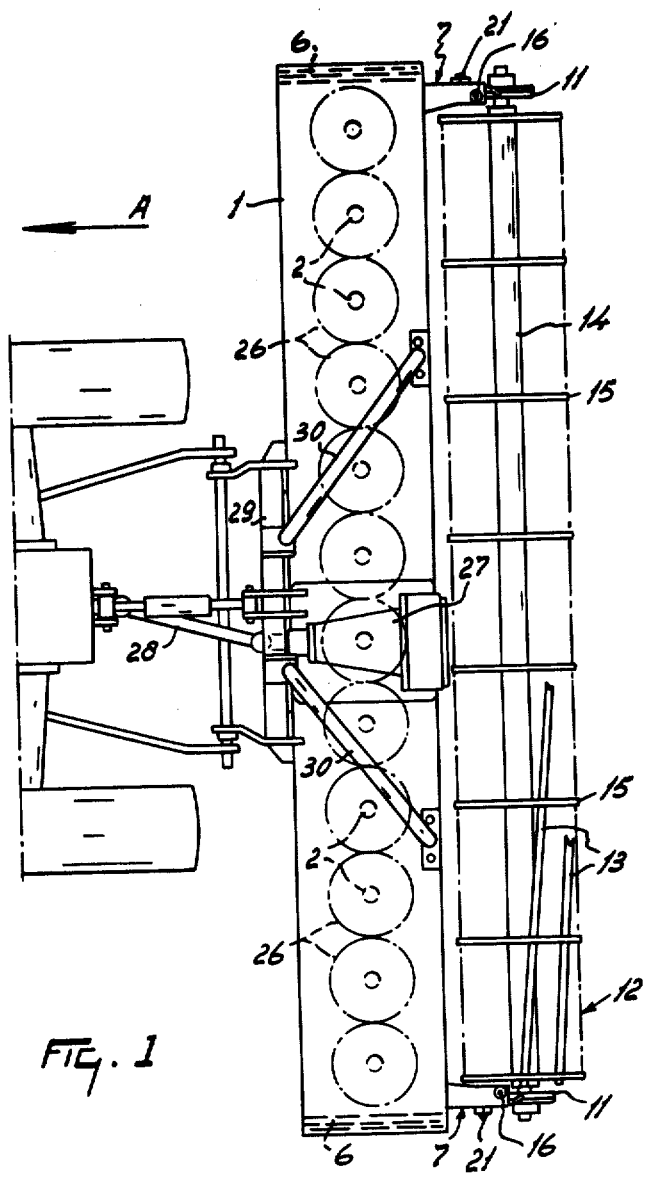

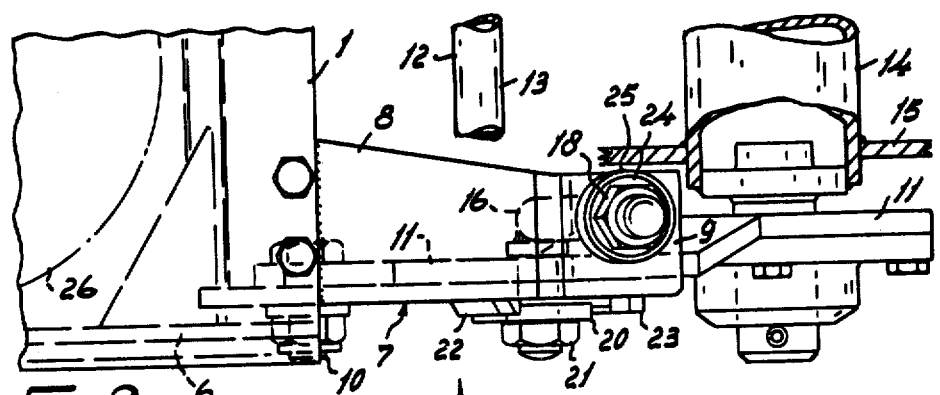
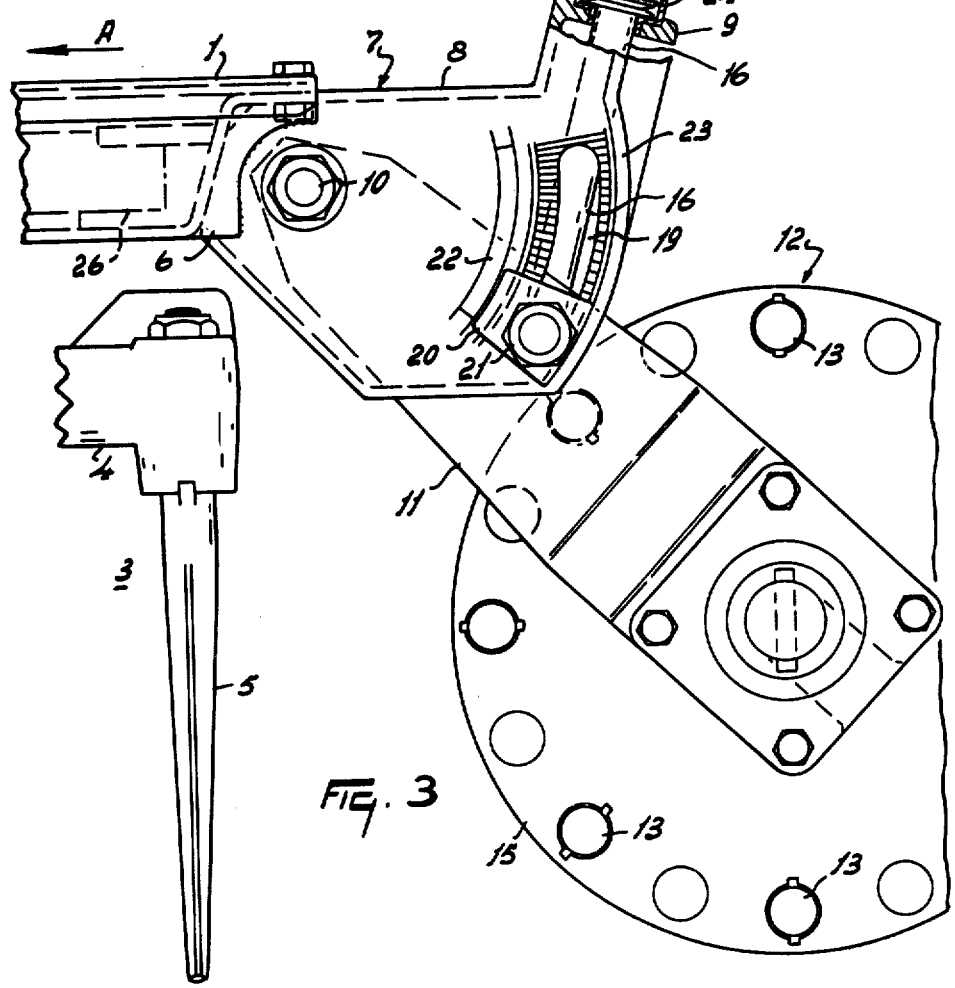

SOIL CULTIVATING MACHINE WITH AXIALLY DISPLACEABLE ADJUSTING ROD

With soil cultivating machines in which there are a plurality of cultivating members disposed in a row extending transversely of the intended direction of operative travel of the machine and adapted to rotate about upwardly extending axes, and behind the cultivating members with respect to the direction just mentioned a ground-engaging roller which is adjustable in a direction of height. It has been found that at the time of adjusting supporting arms of the roller to set the roller at a desired height, if relatively co-operating toothings are provided in a locking mechanism for locking the roller at the set height, the locking mechanism may be exposed to such a loading, brought about by the toothings not being in full engagement, that damage may occur.

According to the present invention there is provided a soil cultivating machine comprising a frame portion extending tansversely of the intended direction of operative travel of the machine and which supports a row of cultivating members that are rotatable about upwardly extending axes; a ground-engaging support means that is behind the cultivating members with respect to said direction and which is pivotally connected with the frame portion by means of supporting arms; mechanism for adjusting the support means in a direction of height; and locking mechanism for locking the support means against pivotal movement relative to the frame portion, this locking mechanism including two parts that are clamped against one another with relatively co-operating toothings interengaged in the locking condition of the locking mechanism, and resilient means which allows relative movement between the co-operating toothings at the time of clamping the toothings together.

In such a machine, as relative movement of the co-operating toothings can occur at the time of making fast the adjustment mechanism, the toothings can fully engage one another without addition load being placed on any non-resilient part of the machine.

For a better understanding of the invention and to show how the same may be carried into effect, reference will now be made, by way of example, to the accompanying drawings, in which:

FIG. 1 is a somewhat schematic plan view of a soil cultivating machine,

FIG. 2 is a plan view on a larger scale of a detail of the machine of FIG. 1,

FIG. 3 is a side view taken in the direction of arrow III in FIG. 2,

Figure 4:
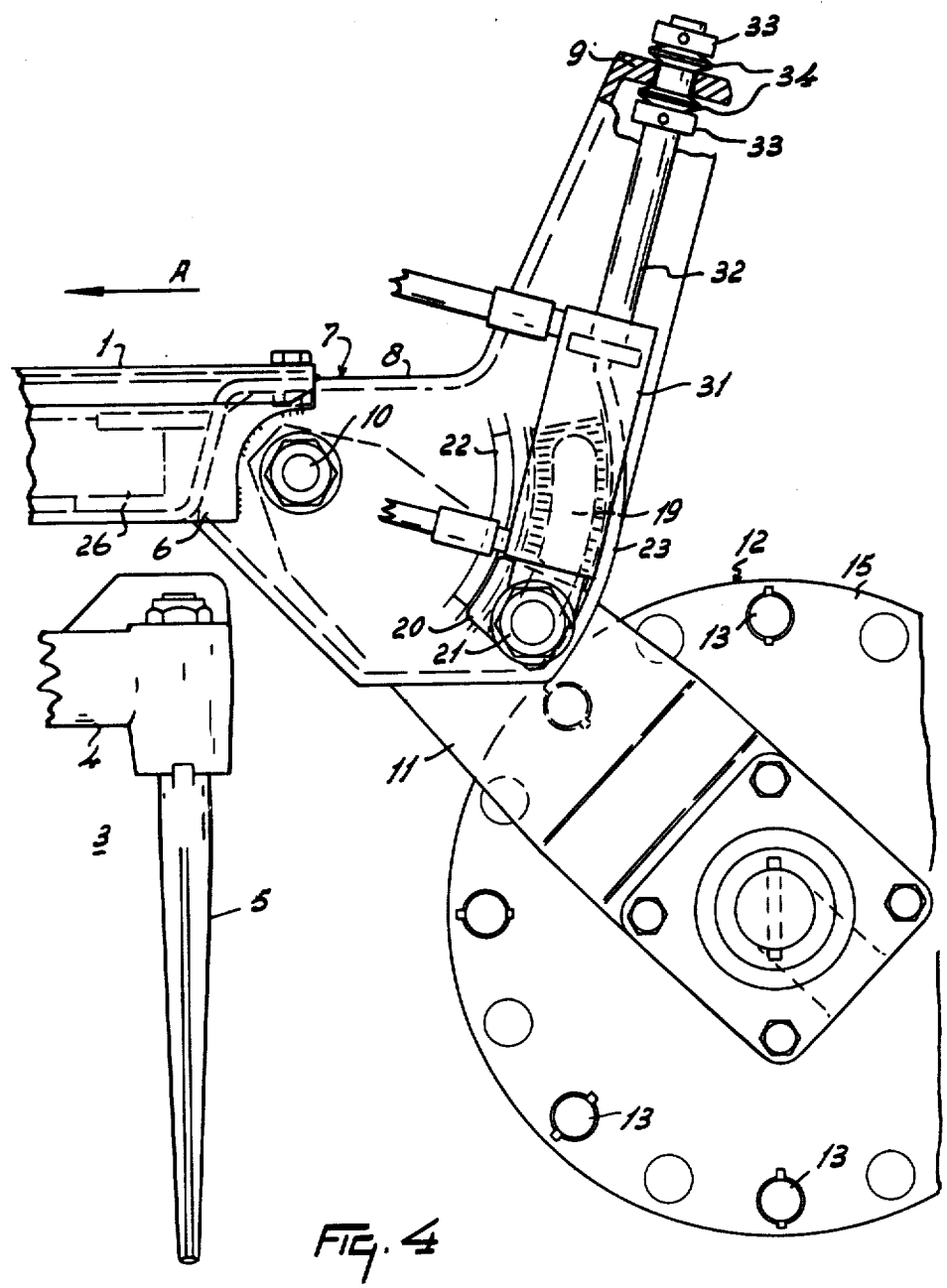
FIG. 4 is a side view similar to FIG. 3, but of a different form of machine.

The soil cultivating machine illustrated in FIGS. 1 to 3 has a hollow frame portion 1 extending transversely of the intended direction A of operative travel of the machine and in which upwardly, preferably vertically, extending shafts 2 of cultivating members 3 are supported at equal intervals. Each cultivating member 3 includes a carrier 4 at the lower end of its shaft 2 and provided at its ends with downwardly extending tines 5.

The ends of the hollow frame portion 1 are closed by means of plates 6. The top of the frame portion 1 is formed by a cover plate which extends, as is shown in FIG. 1, to beyond the plates 6 and is bent over downwards at the ends. At the rear of the frame portion 1, near each end, a carrier 7 formed by a casting is secured by welding, the outer side of each carrier 7 being located just inside the adjacent end of the frame portion. At the front the carrier 7, by a downwardly and forwardly inclined part, abuts the correspondingly shaped rear of the hollow frame portion (FIG. 3). Along its top each carrier 7 has an inwardly directed rim 8 bent over at right angles and having an embossed part at the rear.

Near the frame portion 1 each carrier 7 supports a stub shaft 10 about which an arm 11 pivots, this arm extending to the rear along the inner side of the carrier. Between the free ends of the arms 11 located on the inner side of the carrier 7 (FIG. 2) is supported in a freely rotatable manner a ground-engaging roller 12 provided at its circumference with bars 13 which are held in supports 15 carried by a central part 14. Thus the arms 11 serve as supporting arms for the roller 12.

The embossed part at the rear of each carrier 7 constitutes a support 9 through which is passed a rod 16 of a screw spindle 17 by which the height of the roller above the ground can be infinitely adjusted within a range. The screw spindle 17 has a set screw 18 screwed onto the rod 16. At the lower end the rod 16 is bent over outwardly at right angles and this bent-over portion is passed into a hole in the supporting arm 11 and through a slot 19 in the carrier 7. The longitudinal center line of the slot 19 is located on a circle having its center located on the longitudinal center line of the stub shaft 10. On the outer side of the carrier 7 the bent-over portion of the rod 16 is provided with a clamping piece 20. The clamping piece 20 has toothing that co-operates with corresponding toothing adjacent the sides of the slot 19. The clamping piece 20 can be secured against the carrier 7 by means of a nut 21 on the bent-over end of the rod 16. When the nut 21 is loosened the clamping piece 20 slides between two guides 22 and 23 on the carrier.

Between the nut 18 and the support 9 the rod 16 of the screw spindle is surrounded by a number of cup springs 24—in the embodiment shown three cup springs—locked in a housing 25, the lower wall of which extends into the opening through which the rod 16 passes.

Inside the hollow frame portion 1 each of the shafts 2 is provided with a pinion 26 having straight teeth, the disposition being such that the pinions on the shafts of neighbouring cultivating members 3 are drivably in mesh with one another. Near the center the shaft of a cultivating member 3 is prolonged into a gear box 27. Inside the gear box 27 the prolonged shaft is drivably connected with a shaft extending in the direction of travel A and projecting from the front of the gear box, where it can be coupled by means of an auxiliary shaft 28 with the power take-off shaft of a tractor. The front of the frame portion 1 is provided with a trestle 29, the top of which is fastened to the rear of the frame portion by means of rearwardly inclined, diverging struts 30.

During operating the machine is hitched by means of the trestle 29 to the three-point lifting device of a tractor and with the aid of the auxiliary shaft 28 the cultivating members 3 can be driven via the transmission described above by the power take-off shaft of the tractor in a manner such that neighbouring cultivating members rotate in opposite senses, while their tines 5 work contiguous or overlapping strips of soil during operation. The working depth of the respective cultivating members 3 is adjustable by adjusting the setting of the roller 12. To this end, the roller 12 can be set with the aid of the infinitely adjustable adjustment mechanism that includes the screw spindle 17 for each supporting arm 11 after the locking mechanisms including the clamping pieces 20 and the sides of the carriers 7 have been released. When the supporting arms 11 are set in the desired position, each is fixed in place by tightening its nut 21 so that the toothing of its clamping piece and the toothing on the outer side of the associated carrier 7 are held in engagement. At this time the tips of the teeth of the clamping piece may not be exactly opposite valleys between the teeth of the carrier, so that the clamping piece has to shift either downwards or upwards (and with it the rod 16 of the screw spindle) for the sets of teeth fully to engage with one another. If the deflection of the clamping piece 20 is upwards, the rod 16 can slide upwards in its support and no difficulty arises. However, if the clamping piece is urged to deflect downwards, were it not for the presence of the cup springs 24, the nut 18 would constitute a stop so that the carrier would be exposed to undesirable stress. By providing the resilient means formed by the cup springs 24, a downward movement of the rod 16 against the force of the cup springs is possible and in this way the occurrence of undesirable stresses are avoided when the supporting arms 11 are fixed in place, which stresses might otherwise sooner or later give rise to damage.

Instead of using the screw spindle 17 for adjusting the supporting arms 11, an hydraulically actuated mechanism can be employed as will now be described with reference to FIG. 4. In this Figure all parts corresponding with those already described are designated by the same reference numerals. The lower end of an hydraulic ram 31 is provided with a bent-over part, which like the bent-over part of the rod 16 of the screw spindle 17, is passed through a hole in the arm 11 and through the elongated hole 19, this part being provided with the clamping piece 20, which can be fixed in place with the aid of the screw 21 co-operating with the screwthread of the bent-over part. The hydraulic ram 31 has a piston rod 32 which is passed at the top end through an embossed part 9' of a carrier 7', which is fastened to the rear of the frame portion 1 by welding. On both sides of the embossed part 9' the piston rod 32 is provided with a stop 33 and between each stop and the part 9' there is a cup spring pair 34 of a resilient means. As in the form first described, upon setting the supporting arms 11 by means of the hydraulic rams 31, this construction also permits movement to occur to allow full engagement of the co-operating toothings when the nuts 21 are tightened, the cup springs 34 allowing a displacement of the piston rod in its direction of length.

It will be understood that in all cases the cup springs may be replaced by other, elastically deformable, equivalent elements.

Figure 5:
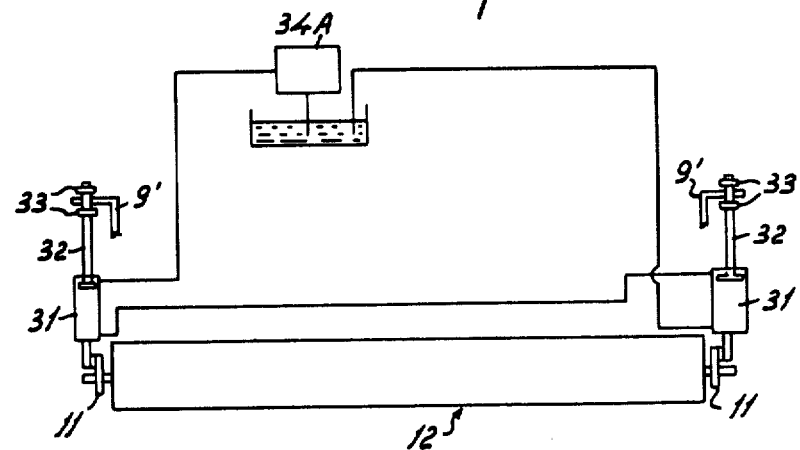
FIG. 5 shows schematically a series connection of hydraulic rams of the machine of the form shown in FIG. 4.

FIG. 5 shows, by way of example, an hydraulic circuit in which setting rams 31 and 31' for the supporting arms 11 of the roller 12 are connected in series. In this series combination the hydraulic ram 31, which is first to receive fluid from a pump 34A, has a smaller diameter than the other hydraulic ram 31', since the fluid supplied from the hydraulic ram 31 is introduced into a space of the ram 31' which is smaller owing to the presence of the piston rod.

Figure 6:
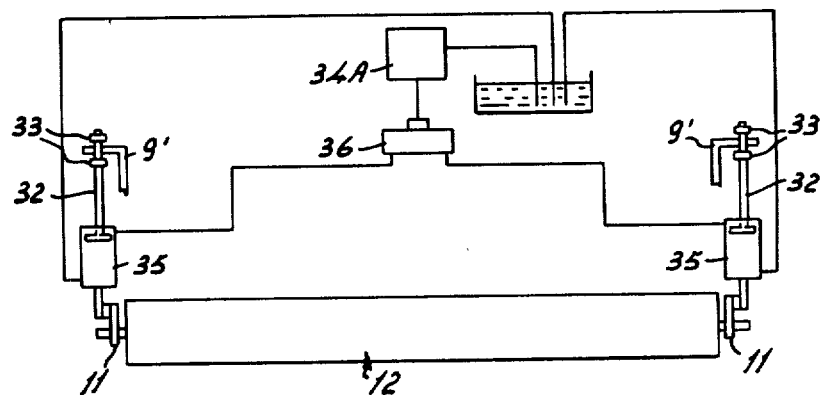
FIG. 6 is similar to FIG. 5 but illustrates a different form.

FIG. 6 illustrates schematically an hydraulic circuit in which setting rams 35 that are of the same size as each other are fed by means of a distribution slide valve 36.

While various features of the soil cultivating machines that have been described, and that are illustrated in the drawings, will be set forth in the following claims as inventive features, it is to be noted that the invention is not necessarily limited to these features and that it encompasses all of the features that have been described both individually and in various combinations.

We claim:

1. A soil cultivating machine movable over the ground, comprising a frame and a portion of said frame extending transverse to the direction of travel, a plurality of cultivating members being supported on said frame portion in side-by-side relationship and in a transverse row, a ground engaging supporting roller being located to the rear of the row of cultivating members, said roller being pivoted to said frame portion with arms and an adjusting mechanism interconnecting each said arm with said frame portion to vary the working position of said cultivating members, said mechanism comprising carrier means attached to the rear of the frame portion and a spindle adjusting rod, said carrier means having an upper flange and a lower slot, the upper part of said adjusting rod extending upwardly through said flange to receive a screw fastener, the lower part of said adjusting rod being bent over and extending generally horizontally through a respective one of said roller arms and said slot, said lower rod part receiving a toothed piece that cooperates with a second toothed piece of the carrier means located adjacent said slot, fastening means clamping the toothed parts together and resilient means on the upper part of said adjusting rod that allows limited displacement of the rod substantially in the direction of its longitudinal axis relative to said carrier means.

2. A soil cultivating machine as claimed in claim 1, wherein said carrier means comprises plural carriers, a respective one of said carriers being fixed at the rear of each side of said frame portion and each of said carriers having a corresponding said slot and said adjusting rod.

3. A soil cultivating machine as claimed in claim 2, wherein said resilient means comprises at least one cup spring on said rod.

4. A soil cultivating machine as claimed in claim 3, wherein said resilient means comprises two relatively co-operating cup springs on said rod.

5. A soil cultivating machine as claimed in claim 3, wherein each of said cup springs encircles the rod and a stop comprising a nut is threaded on said rod to bear on said springs.

6. A soil cultivating machine movable over the ground comprising a frame and a portion of said frame extending transverse to the direction of travel, a plurality of cultivating members being supported on said frame portion in side-by-side relationship and in a transverse row, a ground engaging supporting roller being located to the rear of the row of cultivating members, said roller being pivoted to said frame portion with arms and an adjusting mechanism interconnecting each said arm with said frame portion to vary the working position of said cultivating members, said mechanism comprising carriers attached at the rear of the frame portion and each said carrier mounting an adjusting hydraulic ram, each said carrier having an upper flange and a lower slot, the upper part of said ram being a rod extending upwardly through said flange to receive a fastener, said ram having a lower part comprising a bent over portion extending generally horizontally through a respective one of said arms and said slot, said lower part having a toothed piece that cooperates with a second toothed piece of the carrier located adjacent said slot, fastening means clamping the toothed parts together and resilient means on said rod that allows limited displacement of the rod substantially in the direction of its longitudinal axis relative to said carrier.

7. A soil cultivating machine as claimed in claim 6, wherein said resilient means surrounds said rod above the flange and these are two rams in a hydraulic circuit that are connected in series with one another.

* * * * *